US012548701B2

(12) United States Patent
Taniguchi et al.

(10) Patent No.: US 12,548,701 B2
(45) Date of Patent: *Feb. 10, 2026

(54) DUST CORE AND ELECTRONIC DEVICE

(71) Applicant: TDK CORPORATION, Tokyo (JP)

(72) Inventors: Yusuke Taniguchi, Tokyo (JP); Junichi Seki, Tokyo (JP); Junichi Shimamura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 748 days.

This patent is subject to a terminal disclaimer.

(21) Appl. No.: 17/831,665

(22) Filed: Jun. 3, 2022

(65) Prior Publication Data

US 2022/0406501 A1 Dec. 22, 2022

(30) Foreign Application Priority Data

Jun. 10, 2021 (JP) ................................ 2021-097228

(51) Int. Cl.

| | |
|---|---|
| ***H01F 1/28*** | (2006.01) |
| ***C08G 59/24*** | (2006.01) |
| ***H01F 3/00*** | (2006.01) |
| ***H01F 27/24*** | (2006.01) |
| ***H01F 27/255*** | (2006.01) |

(52) U.S. Cl.

CPC ............ *H01F 1/28* (2013.01); *C08G 59/245* (2013.01); *H01F 3/00* (2013.01); *H01F 27/24* (2013.01); *H01F 27/255* (2013.01)

(58) Field of Classification Search

CPC .......... H01F 1/28; H01F 27/255; H01F 27/24; H01F 3/00; C08G 59/245

See application file for complete search history.

(56) References Cited

U.S. PATENT DOCUMENTS

| | | | |
|---|---|---|---|
| 2008/0248245 | A1 | 10/2008 | Maeda et al. |
| 2021/0002434 | A1 | 1/2021 | Tsuzuki et al. |

FOREIGN PATENT DOCUMENTS

| | | | | |
|---|---|---|---|---|
| JP | 2007-042891 | A | | 2/2007 |
| JP | 2007-051221 | A | | 3/2007 |
| JP | 2016-012671 | A | | 1/2016 |
| JP | 2021-031523 | A | | 3/2021 |
| WO | WO 2019/106810 | | * | 6/2019 |
| WO | 2019-193959 | A1 | | 10/2019 |
| WO | WO 2020/246246 | | * | 12/2020 |

* cited by examiner

*Primary Examiner* — C Melissa Koslow

(74) *Attorney, Agent, or Firm* — Oliff PLC

(57) ABSTRACT

A dust core includes a binder and magnetic particles. The binder includes an epoxy resin. The magnetic particles are dispersed in the binder. The epoxy resin has at least two or more mesogenic skeletons between two epoxy bonds adjacent along a molecular chain.

6 Claims, 2 Drawing Sheets

DUST CORE AND ELECTRONIC DEVICE

Figure 1:
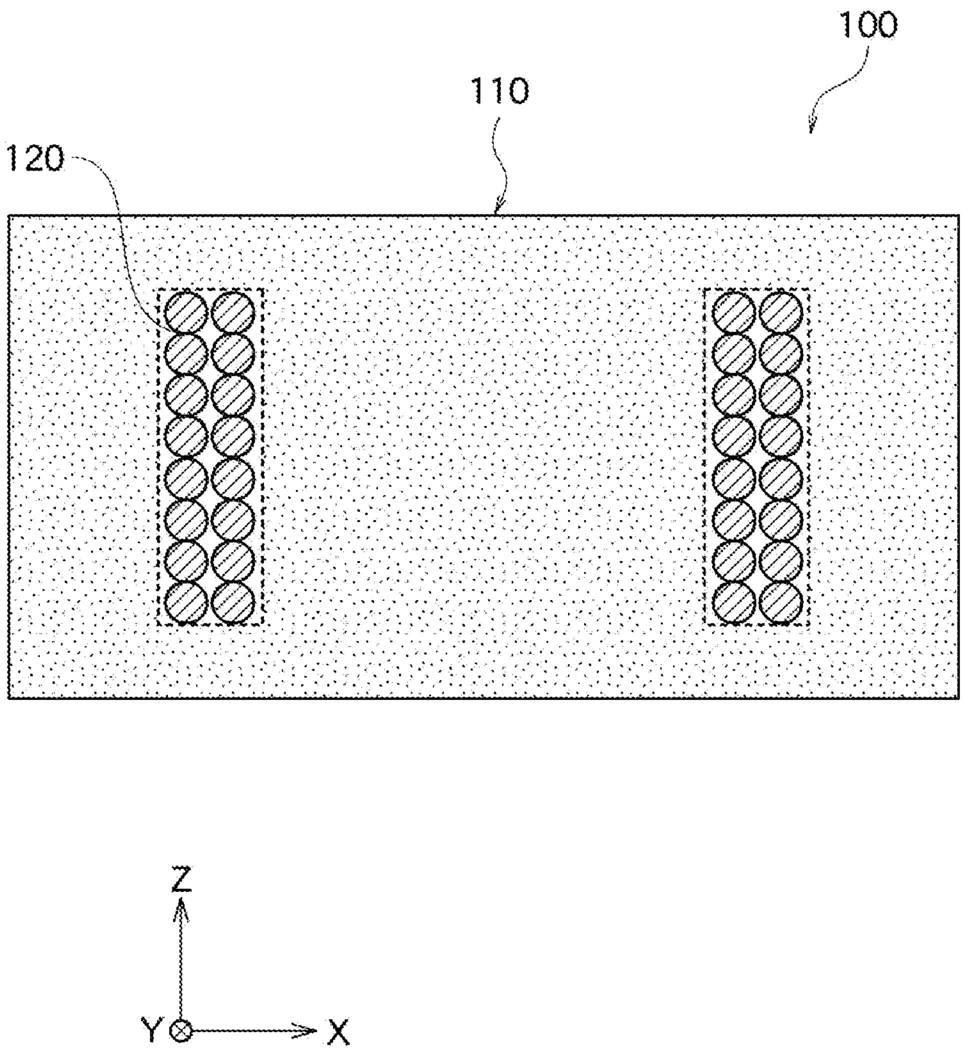

The present application claims a priority on the basis of Japanese patent application No. 2021-097228 filed on Jun. 10, 2021, which is incorporated herein by reference in its entirety.

BACKGROUND

The present disclosure relates to a dust core and an electronic device including the dust core.

Dust cores as shown in Patent Document 1 are known as magnetic cores of magnetic application electronic devices, such as inductors and reactors. The dust cores can be manufactured by, for example, kneading magnetic particles together with a binder. (binding material) and subjecting them to compression molding.

Here, the binder plays a role of electrically insulating magnetic particles while bonding them by melting and flowing in the molding process and being filled between the magnetic particles. Thus, the characteristics of the binder affect characteristics, such as density, strength, and relative permeability, of the dust cores and are one of important design items in the dust cores.

As typical binders used for dust cores, for example, silicone resins, epoxy resins, phenol resins, polyamide resins, polyimide resins, polysilazane resins, polyester resins, polycarbonate resins, water glass, low melting point glass, and the like are known. Among these binders, epoxy resins have advantages for: excellent characteristics, such as adhesive strength, electrical insulation, dimensional stability, and solvent resistance; capability of being cured at a low temperature of 200° C. or less; industrially easy availability at low price; and the like and are used widely and commonly. In particular, Patent Document 1 discloses that a dust core having high relative permeability, high strength, and high thermal conductivity can be obtained with an epoxy resin having a predetermined mesogenic skeleton.

Patent Document 1: JP2016012671 (A)

SUMMARY

A dust core according to the present disclosure comprises:

a binder including an epoxy resin; and magnetic particles dispersed in the binder, wherein the epoxy resin has at least two or more mesogenic skeletons between two epoxy bonds adjacent along a molecular chain.

BRIEF DESCRIPTION OF THE DRAWING(S)

Figure 2:
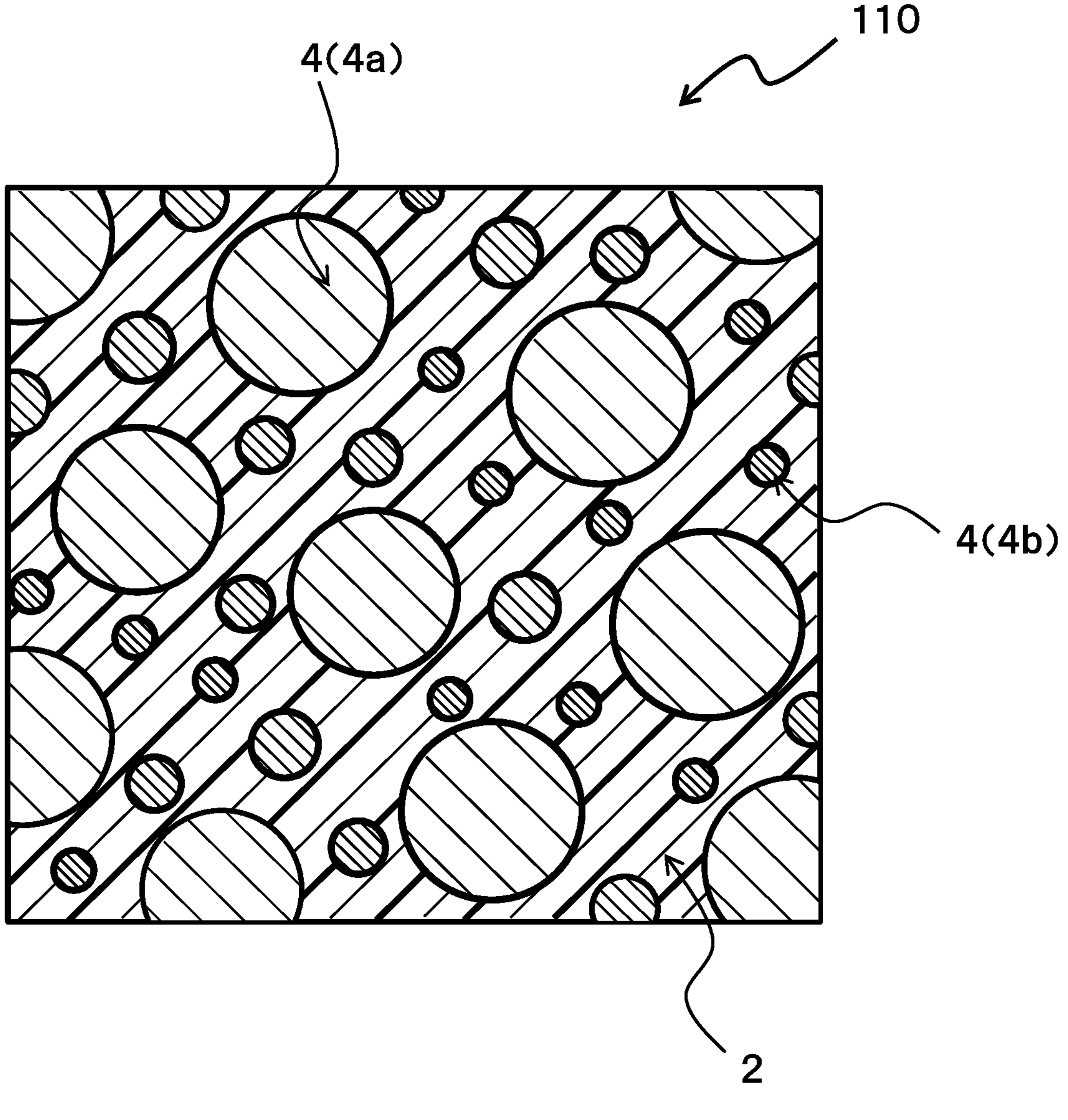

FIG. 1 is one example of a schematic cross-sectional view of an inductor element according to an embodiment of the present disclosure; and FIG. 2 is an enlarged cross-sectional view of a part of a dust core shown in FIG. 1.

DETAILED DESCRIPTION

When a conventional epoxy resin is used in the production of a dust core, molding defects, such as sticking of a green compact to a die, may be generated depending on the molding conditions. In particular, when a warm forming is carried out so as to further improve the magnetic core density, the above-mentioned sticking defects are likely to occur. Thus, it is required to develop a technique that is applicable for warm forming and can more effectively achieve high relative permeability, high strength, and high heat resistance.

As a result of diligent studies, the inventors of the present disclosure have found that the number of mesogenic skeletons existing between epoxy bonds affects sticking defects in warm forming. Specifically, according to the experiments by the inventors of the present disclosure, when an epoxy resin having no mesogenic skeletons or an epoxy resin whose mesogenic-skeleton number between epoxy bonds is only one is used, a green compact is likely to stick to a die during warm forming, and molding defects are likely to occur. Thus, in these conventional epoxy resins, it is necessary to use a lubricant that may lead to decrease in strength or to manufacture a dust core by cold forming, not warm forming. On the other hand, when an epoxy resin having at least two or more mesogenic skeletons between epoxy bonds is used, sticking defects during warm forming can be prevented. As a result, the dust core according to the present disclosure exhibits higher strength, relative permeability, and heat resistance compared to when a conventional epoxy resin is used.

Hereinafter, the present disclosure is explained based on an embodiment shown in the figures.

As shown in FIG. 1, an inductor element 100 according to an embodiment of the present disclosure includes a dust core 110 and a coil 120 embedded in the dust core 110.

The dust core 110 has any shape, such as a columnar shape, an elliptical columnar shape, and a prismatic shape. Then, as shown in FIG. 2, the dust core 110 includes a binder 2 as a binding material and magnetic particles 4 dispersed in the binder 2. In addition, the dust core 110 may include non-magnetic inorganic particles or the like. That is, the dust core 110 is formed into a predetermined shape by binding a plurality of magnetic particles 4 via the binder 2. Hereinafter, the binder 2 and the magnetic particles 4 constituting the dust core 110 are described in detail.

The binder 2 is mainly composed of cured epoxy resin and phenol resin and may contain a trace amount of organic components. Here, the "trace amount of organic component" is a component derived from a lubricant, a curing accelerator, a flexible agent, a plasticizer, a dispersant, a colorant, a settling inhibitor, etc. and may be contained in an amount of about 1.0 part by mass or less with respect to 100 parts by mass of the epoxy resin (the main component of the binder 2).

The present embodiment is characterized in that the epoxy resin of the binder 2 has a predetermined molecular structure. Specifically, the epoxy resin of the binder 2 has a plurality of mesogenic skeletons between two epoxy bonds adjacent along a molecular chain.

Here, the "epoxy bond" in the present embodiment means a molecular arrangement formed by ring-opening of an epoxy group existing in a prepolymer by a polymerization reaction (curing reaction). The "mesogenic skeleton" is a general term for atomic groups containing polycyclic aromatic hydrocarbon or two or more aromatic rings and having rigidity and orientation.

Specifically, preferably, the mesogenic skeleton has a partial structure represented by the following formula (J).

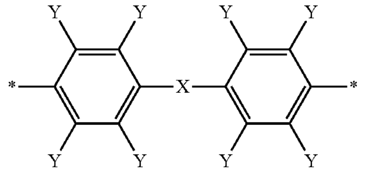

(J)

In the above-mentioned formula (J), X is a single bond or at least one linking group selected from the following group (A).

group (A)

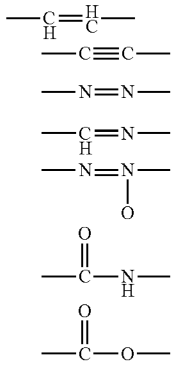

In the above-mentioned formula (J), Y is selected from —H (hydrogen), an alkyl group (an aliphatic hydrocarbon having 4 or less carbon atoms), an acetyl group, and a halogen, and Y(s) in the mesogenic skeleton may be all the same or different from each other. Moreover, * in the formula (J) represents a binding site with an adjacent atom.

In the present embodiment, more preferably, the mesogenic skeleton has a partial structure represented by the following formula (I).

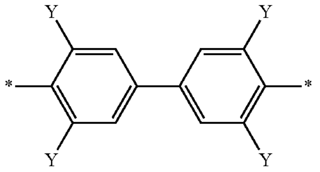

(I)

Y and * in the above-mentioned formula (I) are the same as those in the formula (J). That is, in the mesogenic skeleton shown in the formula (I), X in the formula (J) is a single bond, and the number of Y(s) on which functional groups (side chains such as alkyl group, acetyl group, and halogen) may be arranged is limited more than that in the formula (J).

The mesogenic skeleton as described above is considered to have a function of enhancing the lubricity among the magnetic particles 4 in the molding process and efficiently promoting the rearrangement of the magnetic particles 4. Moreover, stacking (molecular overlap) is likely to be formed between the mesogenic skeletons after curing, and this stacking is considered to contribute to improving the mechanical strength of the binder 2 and the dust core 110. Moreover, the mesogenic skeleton is considered to also exhibit a function of reducing the thermal resistance among the magnetic particles 4. Thus, the formation of the dust core 110 with an epoxy resin having the mesogenic skeleton is expected to improve density, strength, relative permeability, thermal conductivity, and the like. The "rearrangement of the magnetic particles 4" mentioned above means that particles move by pressurization and approach the close-packed state.

In the epoxy resin of the binder 2 in the present embodiment, at least two or more (preferably 10 or less, more preferably three or less) mesogenic skeletons as mentioned above exist between two epoxy bonds adjacent along a molecular chain. The upper limit of the mesogenic skeletons existing between the epoxy bonds is not limited and may be, for example, 100 pieces or less. The plurality of mesogenic skeletons existing between the adjacent epoxy bonds may be different from each other or may all have the same structure. Between the two adjacent epoxy bonds, the plurality of mesogenic skeletons may be connected in a single bond and exist continuously or may be connected via a single or a plurality of linking groups.

Here, "two adjacent epoxy bonds" is explained in more detail. The molecular structure having a plurality of mesogenic skeletons as mentioned above may be achieved by, for example, curing an epoxy resin having a prepolymer as shown in the following formula (K).

(K)

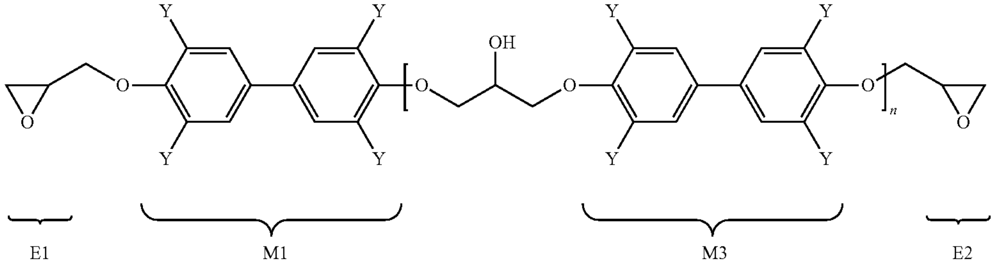

In the prepolymer represented by the formula (K), both of E1 and E2 located at the ends are epoxy groups. M1 and M3 in the formula (K) are mesogenic skeletons. When the epoxy resin containing the prepolymer of the formula (K) is cured, the epoxy groups of E1 and E2 are opened to form a polymer chain. In this case, a molecular chain between the ring-opened E1 and E2 corresponds to "between two epoxy bonds adjacent along the molecular chain", and "one (M1)+n (M3)" mesogenic skeletons exist between the epoxy bonds.

When only a single mesogenic skeleton exists between two adjacent epoxy bonds, molding defects where a green compact sticks to a die during warm forming are likely to occur. Meanwhile, as mentioned above, when a plurality of mesogenic skeletons exists between adjacent epoxy bonds, sticking defects may be prevented, and the dust core 110 may be manufactured not only by cold forming but also by warm forming. That is, the dust core 110 according to the present embodiment includes an epoxy resin having two or more mesogenic skeletons between epoxy bonds and may thereby obtain higher strength, relative permeability, and heat resistance compared to when an epoxy resin having only a single mesogenic skeleton is used.

The number of mesogenic skeletons existing between the epoxy bonds may be determined by analyzing the molecular structure of the binder 2. For example, the molecular structure of the binder 2 is analyzed by appropriately concurrently using nuclear magnetic resonance spectroscopy (NMR), Fourier transform infrared spectroscopy (FT-IR), gas chromatography-mass spectrometry (GC/MS), liquid chromatography-mass spectrometry (LC/MS), etc. A measurement sample is prepared by collecting the binder 2 from the dust core 110 shown in FIG. 1.

In the present embodiment, the magnetic particles 4 may be oxide magnetic particles such as soft ferrite, but are preferably soft magnetic metal particles. Examples of the soft magnetic metal particles include pure iron, Fe—Si based alloy (iron-silicon), Fe—Al based alloy (iron-aluminum), permalloy based alloy (Fe—Ni), and sendust based alloy (Fe—Si—Al), Fe—Si—Cr based alloy (iron-silicon-chromium), Fe—Si—Al—Ni based alloy, Fe—Ni—Si—Co based alloy, Fe based amorphous alloy, and Fe based nanocrystalline alloy.

Preferably, an insulating coating is formed on the surfaces of the soft magnetic metal particles as mentioned above. Examples of the insulating coating include a coating (oxide film) due to oxidation of the particle surface layer, a phosphate coating, a silicate coating, a glass coating, an inorganic coating containing BN, $SiO_2$, MgO, $Al_2O_3$, etc., and an organic coating. These insulating coatings can be formed by a surface treatment, such as heat treatment, phosphate treatment, mechanical alloying treatment, silane coupling treatment, and hydrothermal synthesis. The formation of the insulating coating on the soft magnetic metal particles can prevent the high frequency loss of the dust core 110.

The magnetic particles 4 have any average particle size (D50) and can have an average particle size (D50) of, for example, 50 μm or less. Preferably, the magnetic particles 4 have an average particle size (D50) of 20 μm to 40 μm. The average particle size of the magnetic particles 4 is measured by image analysis of a cross section of the dust core 110 as shown in FIG. 2. Specifically, a particle size distribution of the magnetic particles 4 is obtained by measuring an area of each particle contained in the cross section as shown in FIG. 2 and calculating a circle equivalent diameter of each particle from each area. In this measurement, the size of the measurement visual field is appropriately adjusted based on the particle sizes of the magnetic particles 4 to be observed, and the analysis is preferably performed in at least five visual fields to obtain a particle size distribution.

The magnetic particles 4 contained in the dust core 110 may all be made of the same material or may be made of a plurality of particle groups made of different materials. As shown in FIG. 2, the magnetic particles 4 may be made of a plurality of particle groups having different particle sizes. For example, the magnetic particles 4 can be formed by mixing large particles 4*a* made of a Fe—Si based alloy and small particles 4*b* made of pure iron having an average particle size smaller than that of the large particles 4*a*.

The average circularity of the magnetic particles 4 in a cross section of the dust core 110 is not limited, but the average circularity of the magnetic particles 4 is preferably as high as 0.9 or more and is more preferably 0.95 or more, in consideration of the DC bias characteristic. The average circularity of the magnetic particles 4 can be measured by image analysis of the cross section of the dust core 110 as shown in FIG. 2. Specifically, an area S and a length L of the contour line of each magnetic particle 4 contained in the cross-sectional image are measured, and the circularity is calculated based on the following formula. This measurement is performed on at least 50 or more magnetic particles 4 to obtain a circularity distribution, and a circularity having a cumulative frequency of 50% is calculated as an average circularity.

$$\text{Circularity}=4\pi S/L^2$$

Here, the relation between the average circularity of the magnetic particles 4 and the strength of the dust core 110 is additionally explained. In the case of spherical magnetic particles having a high average circularity as mentioned above, the entanglement of particles, which is called an anchoring effect, is less likely to occur among adjacent particles, and the strength of the dust core generally decreases. Even if the magnetic particles 4 having a high circularity are used, the dust core 110 of the present embodiment can have a high strength by containing an epoxy resin having a plurality of mesogenic skeletons between epoxy bonds.

When the magnetic particles 4 are metal magnetic particles, the amount of the binder 2 in the dust core 110 is preferably 4.0 parts by mass or less and is more preferably 1.0 part by mass to 4.0 parts by mass, with respect to 100 parts by mass of the magnetic particles 4. In the dust core 110 of the present embodiment, the use of an epoxy resin having a plurality of mesogenic skeletons between epoxy bonds can maintain the shape retention and obtain a high strength even if the ratio of the binder 2 to the magnetic particles 4 is low. When the amount of the binder 2 is within the above-mentioned range, both strength and magnetic characteristics can be improved.

The amount of the binder can be estimated by analyzing the dust core with an inductively coupled plasma emission spectrophotometer (ICP-AES). At this time, the amount of the binder is calculated by dissolving the dust core with, for example, hydrochloric acid to prepare a sample for analysis and estimating the intensity of the element detected by ICP-AES.

The inductor element 100 with the dust core 110 including the binder 2 and the magnetic particles 4 described above has an excellent heat resistance. Specifically, $R_A/R_B>0.001$ is preferably satisfied, and $R_A/R_B\geq0.01$ is more preferably satisfied, where $R_A$ is a volume resistance of the dust core 110 after keeping the inductor element 100 at 175° C. for 100 hours, and $R_B$ of the dust core 110 is a volume resistance before keeping the inductor element 100 at 175° C. for 100 hours. $R_A/R_B$ represents a change rate in volume resistance after the keep. When $R_A/R_B$ is larger and closer to 1.0, the change rate in volume resistance is smaller, and the heat resistance of the inductor element is more excellent.

$R_B$ before the keep is preferably $1\times10^{12}$ Ω·cm or more, and $R_A$ after the keep is preferably $1\times10^{9}$ Ω·cm or more. The volume resistance is measured using a high resistance meter (e.g., HP 4339B).

In the inductor element 100 of the present embodiment, since an epoxy resin having two or more mesogenic skeletons between epoxy bonds is contained in the dust core, the above-mentioned heat resistance can be obtained. As a result, in the inductor element 100, the energy loss can be reduced, and it is possible to favorably achieve downsizing of an inductor and high electric current.

Next, one example of a method of manufacturing the inductor element 100 shown in FIG. 1 is explained.

First, a resin material (a raw material of the binder 2) and a raw material powder of the magnetic particles 4 are prepared. The raw material powder of the magnetic particles 4 can be produced by a known powder production method, such as gas atomizing method, water atomizing method, rotary disk method, and carbonyl method. Instead, the raw material powder may be produced by mechanically pulverizing a ribbon obtained by the single roll method. The particle sizes of the magnetic particles 4 can be controlled by performing a sieve classification, an air flow classification, or the like after obtaining the raw material powder of the magnetic particles 4 with the above-mentioned production method. When insulating coatings are formed on the surfaces of the magnetic particles 4, the raw material powder obtained above is subjected to a heat treatment or a surface treatment, such as phosphate treatment, mechanical alloying treatment, silane coupling treatment, and hydrothermal synthesis.

As the resin raw material of the binder 2, an epoxy resin made of a prepolymer before curing is prepared. This epoxy resin has at least two or more mesogenic skeletons between the two epoxy groups located at the ends of the prepolymer.

Then, the above-mentioned epoxy resin and a curing agent are dissolved in a solvent to prepare a paste. At this time, it is preferable to use a phenol resin having a molecular weight of about 500 to 10,000 as the curing agent, and it is preferable to use, for example, a biphenyl aralkyl type curing agent or a p-xylylene type curing agent. The solvent is not limited and can be acetone, isopropyl alcohol (IPA), methyl ethyl ketone (MEK), butyl diglycol acetate (BCA), methanol, or the like. A curing accelerator (curing catalyst), a lubricant, a flexible agent, a plasticizer, a dispersant, a colorant, a settling inhibitor, etc. may appropriately be added to the paste. The addition amount of the curing agent is appropriately determined according to the blending amount of the epoxy resin.

Next, the raw material powder of the magnetic particles 4 and the paste containing the epoxy resin are put into a kneading machine, such as a kneader and a twin-screw extruder, and kneaded to prepare a precursor for the dust core. At this time, preferably, the raw material powder and the paste are mixed so that the amount of the binder 2 is 1-4 parts by mass with respect to 100 parts by mass of the magnetic particles. In the kneading step, non-magnetic ceramic particles or the like may be appropriately added depending on the use of the inductor element.

Next, a dust core is manufactured using the above-mentioned precursor. In the case of the inductor element 100 shown in FIG. 1, the precursor is filled in a die together with an air-core coil as an insert member and subjected to compression molding. As a result, a green compact having the shape of the dust core to be manufactured is obtained and appropriately subjected to a heat treatment so as to cure the epoxy resin in the green compact. The heat-treatment conditions at this time are not limited and are conditions under which the epoxy resin is sufficiently cured. For example, the heat-treatment temperature is 150° C. to 200° C., and the treatment time is 1 hour to 5 hours. The atmosphere during the heat treatment is not limited and may be an air atmosphere.

After the above-mentioned steps, the inductor element 100 in which the coil 120 is embedded in the dust core 110 is obtained.

Summary of Present Embodiment

The dust core 110 of the present embodiment includes the binder 2 containing an epoxy resin and a phenol resin and the magnetic particles 4 dispersed in the binder 2. The epoxy resin contained in the binder 2 has at least two or more mesogenic skeletons between two epoxy bonds adjacent along a molecular chain.

As a result of diligent studies, the inventors of the present disclosure have found that the number of mesogenic skeletons existing between epoxy bonds affects sticking defects in warm forming. Specifically, according to the experiments by the inventors of the present disclosure, when an epoxy resin having no mesogenic skeletons or an epoxy resin whose mesogenic-skeleton number between epoxy bonds is only one is used, a green compact is likely to stick to a die during warm forming, and molding defects are likely to occur. Thus, in these conventional epoxy resins, it is necessary to use a lubricant that can lead to decrease in strength or to manufacture a dust core by cold forming, not warm forming. On the other hand, when an epoxy resin having at least two or more mesogenic skeletons between epoxy bonds is used, sticking defects during warm forming can be prevented. As a result, the dust core 110 according to the present embodiment exhibits higher strength, relative permeability, and heat resistance compared to when a conventional epoxy resin is used.

The reason why the above-mentioned effects are obtained is not necessarily clear, but steric hindrance due to multiple mesogenic skeletons is considered to be involved.

In the inductor element 100 including the dust core 110, $R_A/R_B>0.001$ is satisfied, where $R_A$ is a volume resistance after keeping the inductor element 100 at 175° C. for 100 hours, and $R_B$ is a volume resistance before keeping the inductor element 100 at 175° C. for 100 hours. As a result, in the inductor element 100 according to the present embodiment, the energy loss can be reduced, and it is possible to favorably achieve downsizing of an inductor and high electric current.

Hereinbefore, an embodiment of the present disclosure is explained, but the present disclosure is not limited to the above-mentioned embodiment and can be modified variously without departing from the gist of the present disclosure.

For example, an electronic device such as an inductor element may be configured by combining a plurality of dust cores. The dust core may have any shape, such as toroidal, FT, ET, EI, UU, EE, EER, UI, drum, pot, and cup. In the above-mentioned embodiment, the coil is embedded in the dust core, but the arrangement of the coil is not limited to the configuration shown in FIG. 1, and the coil may be formed by winding a conducting wire on the outside of the dust core.

The method of manufacturing the dust core is not limited to one in the above-mentioned embodiment, and the dust core may be manufactured by a sheet method or injection molding or may be manufactured by two-step compression. In the method by two-step compression, for example, a precursor is temporarily compressed to prepare a plurality of preliminary green compacts, and these green compacts and an air-core coil are thereafter combined and subjected to main compression.

The inductor element 100 is explained in the above-mentioned embodiment, but the dust core of the present disclosure is also applicable to electronic devices such as reactors, transformers, non-contact power feeding devices, and magnetic shield components.

EXAMPLES

Hereinafter, the present disclosure is explained in more detail based on specific examples. However; the present disclosure is not limited to the following examples.

Examples 1-16

In the present examples, inductor samples according to Examples 1-16 were manufactured by the following manner.

First, a Fe-4.5Si alloy powder was produced as a raw material powder of magnetic particles 4 by a gas atomizing method. A $SiO_2$ film having an average thickness of about 100 nm was formed on the surface of this raw material powder by heat treatment.

Next, a biphenyl type epoxy resin made of a prepolymer was prepared. This epoxy resin had a plurality of mesogenic skeletons represented by the formula (I) between epoxy groups located at the ends of the prepolymer. Specifically, the number of mesogenic skeletons existing between epoxy groups was: 2 (Examples 1-3), 3 (Examples 4-7 and 14), and 10 (Examples 8-10 and 15), and 20 (Examples 11-13 and 16).

The above-mentioned epoxy resin and a curing agent were dissolved in an acetone solvent to obtain a paste. At this time, a biphenyl aralkyl type curing agent A was used in Examples 1-13, and a p-xylylene type curing agent B was used in Examples 14-16. In each of Examples, the addition amount of the curing agent was 50 parts by mass with respect to 100 parts by mass of the epoxy resin, and 1 part by mass of a curing accelerator was further added with respect to 100 parts by mass of the epoxy resin.

Next, the above-mentioned paste and a Fe-4.5Si alloy powder were kneaded with a kneader to obtain precursors for dust core according to Examples 1-16. At this time, the blending ratio between the paste and the alloy powder was adjusted so that the amount of the binder 2 with respect to 100 parts by mass of the magnetic particles was in the range of 1-5 parts by mass.

Next, the precursors were put into a die and subjected to a compression molding to obtain toroidal green compacts. The compression molding was carried out by both cold forming and warm forming, and samples produced by cold forming and samples produced by warm forming were obtained in each Example. The cold forming was carried out at a molding pressure of 8.0 MPa, and the warm forming was carried out at a molding pressure of 4.0 MPa and a molding temperature of 110° C. After the compression molding, dust core samples according to Examples 1-16 were obtained by heating the green compacts at 180° C. for 3 hours to cure the epoxy resin in the green compacts. The toroidal die had outer diameter: 17.5 mm and inner diameter: 10.0 mm, and the dust core samples were produced by weighing 5.0 g. The prepared dust core samples had a thickness (height) of about 5 mm.

The following evaluations were carried out for the dust core samples for each Example.

(Measurement of Mesogenic-Skeleton Number)

An analysis sample for molecular structure analysis was collected from the manufactured dust core samples. Then, NMR, FT-IR, GC/MS, and LC/MS were performed so as to analyze the molecular structure of the binder 2, and the number of mesogenic skeletons existing between two adjacent epoxy bonds was determined.

(Analysis of Dust Core)

The dust core samples were analyzed by ICP-AES, and the amount of the binder contained in the dust cores was measured. Then, the amount of the binder 2 with respect to 100 parts by mass of the magnetic particles was calculated from the measured intensity of elements. As a result, in each of Examples, the amount of the binder 2 was the same as the target value at the time of production and was about the same as the blending amount of the epoxy resin in the precursor.

In the cross-sectional observation by SEM, an average particle size (D50) and an average circularity of the magnetic particles 4 were measured. As a result, in all Examples, the average particle size was in the range of 20-40 μm, and the average circularity was 0.95 or more.

(Ring Crushing Strength Test)

The strength of the dust cores were evaluated by performing a ring crushing strength test based on JIS.Z2507. When the ring crushing strength was 120 MPa or more, the strength characteristics of the sample were considered to be good.

(Measurement of Relative Permeability)

In addition, a conducting wire was wound around the manufactured toroidal dust core samples for 30 turns to manufacture inductor elements, and their relative permeability was measured. The relative permeability was measured as shown below. An inductance at a frequency of 100 kHz and a DC bias magnetic field of 50 mT was measured using an LCR meter and a DC bias power supply, and a relative permeability at room temperature was calculated from this inductance. As for the relative permeability, 25 or more was considered to be pass, 26 or more was considered to be good, and 28 or more was considered to be very good.

(Heat Resistance Evaluation)

In a heat resistance test, the inductor elements were held at 175° C. for 100 hours, and a change rate in volume resistance before and after the test was measured. Specifically, $R_A/R_B$ in each Example was calculated, where $R_A$ was a volume resistance after keeping the inductor elements at 175° C. for 100 hours, and $R_B$ was a volume resistance before keeping the inductor elements at 175° C. for 100 hours. The higher $R_A/R_B$ was, the better the heat resistance was. In the present examples, $R_A/R_B>0.001$ was considered to be pass, and $R_A/R_B\geq 0.01$ was considered to be very good. The volume resistance of the dust core was measured by applying a probe of Φ1.0 mm in parallel to the thickness direction using a high resistance meter (HP 4339B).

Comparative Examples 1-3

In Comparative Example 1, dust core samples were manufactured using an o-cresol novolak type epoxy resin having no mesogenic skeleton. In Comparative Example 2 and Comparative Example 3, dust core samples were manufactured using a biphenyl type epoxy resin whose number of mesogenic skeletons existing between adjacent epoxy bonds was only one. A biphenyl aralkyl type curing agent A was used in Comparative Example 2, and a p-xylylene type curing agent B was used in Comparative Example 3. In Comparative Examples 1-3, the type of the epoxy resin to be used was changed, but the experimental conditions other than the type of the epoxy resin were the same as those of the above-mentioned examples, and the same evaluations as those of the respective examples were carried out.

The evaluation results of each Example and each Comparative Example are shown in Table 1.

TABLE 1

| | | | | Characteristics of Sample Manufactured by Cold Forming | | | | |
|---|---|---|---|---|---|---|---|---|
| Sample No. | Type of Curing Agent — | Number of Mesogenic Skeletons between Epoxy Bonds pieces | Amount of Binder parts by mass | Strength MPa | Relative Permeability — | Volume Resistance $R_B$ Before Test Ω · cm | Volume Resistance $R_A$ After Test Ω · cm | $R_A/R_B$ — |
| Comp. Ex. 1 | curing agent A | 0 | 2 | 70 | 27.2 | $1.5 \times 10^{12}$ | $2.8 \times 10^{8}$ | 0.0002 |
| Comp. Ex. 2 | curing agent A | 1 | 2 | 95 | 27.5 | $1.3 \times 10^{12}$ | $3.6 \times 10^{8}$ | 0.0003 |
| Comp. Ex. 3 | curing agent B | 1 | 2 | 93 | 27.3 | $2.2 \times 10^{12}$ | $4.1 \times 10^{8}$ | 0.0002 |
| Ex. 1 | curing agent A | 2 | 1 | 132 | 29.2 | $1.1 \times 10^{12}$ | $6.9 \times 10^{9}$ | 0.0063 |
| Ex. 2 | curing agent A | 2 | 2 | 152 | 27.1 | $1.5 \times 10^{12}$ | $8.6 \times 10^{9}$ | 0.0057 |
| Ex. 3 | curing agent A | 2 | 4 | 203 | 25.9 | $4.5 \times 10^{12}$ | $2.9 \times 10^{10}$ | 0.0064 |
| Ex. 4 | curing agent A | 3 | 1 | 130 | 29.0 | $1.5 \times 10^{12}$ | $2.8 \times 10^{10}$ | 0.0187 |
| Ex. 5 | curing agent A | 3 | 2 | 151 | 27.5 | $1.7 \times 10^{12}$ | $3.3 \times 10^{10}$ | 0.0194 |
| Ex. 6 | curing agent A | 3 | 4 | 201 | 26.2 | $1.8 \times 10^{12}$ | $2.3 \times 10^{10}$ | 0.0128 |
| Ex. 7 | curing agent A | 3 | 5 | 206 | 25.0 | $5.1 \times 10^{12}$ | $1.6 \times 10^{11}$ | 0.0314 |
| Ex. 8 | curing agent A | 10 | 1 | 128 | 29.2 | $1.9 \times 10^{12}$ | $2.2 \times 10^{10}$ | 0.0116 |
| Ex. 9 | curing agent A | 10 | 2 | 147 | 27.3 | $1.8 \times 10^{12}$ | $4.9 \times 10^{10}$ | 0.0272 |
| Ex. 10 | curing agent A | 10 | 4 | 195 | 25.8 | $1.2 \times 10^{12}$ | $2.9 \times 10^{10}$ | 0.0242 |
| Ex. 11 | curing agent A | 20 | 1 | 120 | 29.3 | $2.1 \times 10^{12}$ | $3.5 \times 10^{10}$ | 0.0167 |
| Ex. 12 | curing agent A | 20 | 2 | 137 | 27.5 | $3.8 \times 10^{12}$ | $4.1 \times 10^{10}$ | 0.0108 |
| Ex. 13 | curing agent A | 20 | 4 | 183 | 26.0 | $1.2 \times 10^{12}$ | $1.5 \times 10^{10}$ | 0.0125 |
| Ex. 14 | curing agent B | 3 | 2 | 152 | 27.1 | $1.1 \times 10^{12}$ | $1.4 \times 10^{10}$ | 0.0127 |
| Ex. 15 | curing agent B | 10 | 2 | 149 | 27.4 | $1.5 \times 10^{12}$ | $2.9 \times 10^{10}$ | 0.0193 |
| Ex. 16 | curing agent B | 20 | 2 | 146 | 27.5 | $2.3 \times 10^{12}$ | $3.3 \times 10^{10}$ | 0.0143 |

| | Characteristics of Sample Manufactured by | Characteristics of Sample Manufactured by Warm Forming | | | | | | |
|---|---|---|---|---|---|---|---|---|
| Sample No. | Cold Forming Evaluation of Heat Resistance — | Sticking Defects Presence or Absence | Strength MPa | Relative Permeability — | Volume Resistance $R_B$ Before Test Ω · cm | Volume Resistance $R_A$ After Test Ω · cm | $R_A/R_B$ — | Evaluation of Heat Resistance — |
| Comp. Ex. 1 | <0.001 | present | — | — | — | — | — | — |
| Comp. Ex. 2 | <0.001 | present | — | — | — | — | — | — |
| Comp. Ex. 3 | <0.001 | present | — | — | — | — | — | — |
| Ex. 1 | >0.001 | absent | 156 | 33.7 | $2.9 \times 10^{12}$ | $5.9 \times 10^{9}$ | 0.0020 | >0.001 |
| Ex. 2 | >0.001 | absent | 204 | 31.8 | $1.8 \times 10^{12}$ | $9.6 \times 10^{9}$ | 0.0053 | >0.001 |
| Ex. 3 | >0.001 | absent | 253 | 28.0 | $3.7 \times 10^{12}$ | $1.9 \times 10^{10}$ | 0.0051 | >0.001 |
| Ex. 4 | >0.01 | absent | 155 | 34.0 | $2.5 \times 10^{12}$ | $3.4 \times 10^{10}$ | 0.0136 | >0.01 |
| Ex. 5 | >0.01 | absent | 202 | 32.1 | $3.7 \times 10^{12}$ | $3.9 \times 10^{10}$ | 0.0105 | >0.01 |
| Ex. 6 | >0.01 | absent | 250 | 27.8 | $3.8 \times 10^{12}$ | $4.3 \times 10^{10}$ | 0.0113 | >0.01 |
| Ex. 7 | >0.01 | absent | 260 | 25.5 | $5.5 \times 10^{12}$ | $2.6 \times 10^{11}$ | 0.0473 | >0.01 |
| Ex. 8 | >0.01 | absent | 150 | 33.5 | $1.1 \times 10^{12}$ | $2.5 \times 10^{10}$ | 0.0227 | >0.01 |
| Ex. 9 | >0.01 | absent | 197 | 32.0 | $1.4 \times 10^{12}$ | $4.4 \times 10^{10}$ | 0.0314 | >0.01 |
| Ex. 10 | >0.01 | absent | 246 | 27.8 | $1.5 \times 10^{12}$ | $1.9 \times 10^{10}$ | 0.0127 | >0.01 |
| Ex. 11 | >0.01 | absent | 154 | 33.9 | $2.0 \times 10^{12}$ | $3.1 \times 10^{10}$ | 0.0155 | >0.01 |
| Ex. 12 | >0.01 | absent | 205 | 32.2 | $3.1 \times 10^{12}$ | $4.8 \times 10^{10}$ | 0.0155 | >0.01 |
| Ex. 13 | >0.01 | absent | 248 | 28.0 | $1.8 \times 10^{12}$ | $2.9 \times 10^{10}$ | 0.0161 | >0.01 |
| Ex. 14 | >0.01 | absent | 203 | 32.3 | $1.0 \times 10^{12}$ | $3.1 \times 10^{10}$ | 0.0310 | >0.01 |
| Ex. 15 | >0.01 | absent | 200 | 31.8 | $2.5 \times 10^{12}$ | $3.9 \times 10^{10}$ | 0.0156 | >0.01 |
| Ex. 16 | >0.01 | absent | 197 | 31.8 | $2.0 \times 10^{12}$ | $3.3 \times 10^{10}$ | 0.0165 | >0.01 |

As shown in Table 1, in Comparative Example 1 (no mesogenic skeleton) and Comparative Examples 2 and 3 (the number of mesogenic skeletons was only one), the ring crushing strength was less than 120 MPa, and the pass/fail criteria for strength was not satisfied. In Comparative Examples 1-3, $R_A/R_B$ was 0.001 or less, and the pass/fail criteria for heat resistance was not satisfied either. Moreover, in Comparative Examples 1-3, sticking defects to the die were generated during warm forming, and it was difficult to obtain good products. That is, in Comparative Examples 1-3, the characteristics of the samples obtained by warm forming were not evaluated, and only the cold forming method was applied.

On the other hand, in Examples 1-16 (the number of mesogenic skeletons existing between epoxy bonds was two or more), when the dust cores were manufactured by cold forming, a higher strength than in Comparative Examples 1-3 was obtained, and the pass/fail criteria for heat resistance was satisfied. This result indicates that high strength, high relative permeability, and high heat resistance can be achieved at the same time by setting the number of mesogenic skeletons existing between epoxy bonds to a plurality, not a singular.

In Examples 1-16, sticking defects during warm forming was prevented, and the dust cores having higher strength and relative permeability than by cold forming were obtained by warm forming. This result indicates that molding defects can be prevented dramatically, and each characteristic (strength, relative permeability, heat resistance) can be improved more efficiently, by setting the number of mesogenic skeletons existing between epoxy bonds to a plurality, not a singular.

Comparing the evaluation results of Examples, the relative permeability tended to be higher with a lower amount of the binder in the dust core, and the strength tended to be higher with a higher amount of the binder. Then, it was found that when the amount of the binder was 1-4 parts by mass, the strength and the magnetic characteristics were improved in a well-balanced manner. Moreover, the result of Example 7 confirms that the permeability tended to decrease when the amount of the binder was more than 4 parts by mass. The above-mentioned results indicate that the amount of the binder with respect to 100 parts by mass of metal magnetic particles was preferably in the range of 1-4 parts by mass.

<Supplementary Notes>

A part or all of the above-mentioned embodiment and examples may be described as the following supplementary notes, but are not limited thereto.

(Supplementary Note 1)

A dust core comprising:

a binder including an epoxy resin; and magnetic particles dispersed in the binder, wherein the epoxy resin has at least two or more mesogenic skeletons between two epoxy bonds adjacent along a molecular chain.

(Supplementary Note 2)

The dust core according to supplementary note 1, wherein the magnetic particles comprise metal magnetic particles, and an amount of the binder with respect to 100 parts by mass of the metal magnetic particles is 1.0 part by mass or more and 4.0 parts by mass or less.

(Supplementary Note 3)

The dust core according to supplementary note 1 or 2, wherein the mesogenic skeletons have a structure represented by the following formula (I), (I)

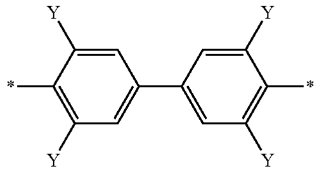

where Y of the formula (I) is selected from —H, an alkyl group (aliphatic hydrocarbons with 4 or less carbon atoms), an acetyl group, and a halogen, Y(s) in the mesogenic skeletons may be all the same or different from each other, and

* represents a binding site with an adjacent atom.

(Supplementary Note 4)

An inductor comprising the dust core according to any of supplementary notes 1 to 3.

(Supplementary Note 5)

The inductor according to supplementary note 4, wherein $R_A/R_B>0.001$ is satisfied, where $R_A$ is a volume resistance after keeping the inductor at 175° C. for 100 hours, and $R_B$ is a volume resistance before keeping the inductor at 175° C. for 100 hours.

DESCRIPTION OF THE REFERENCE NUMERICAL

100 . . . inductor element
110 . . . dust core
2 . . . binder
4 . . . magnetic particle
**4*a*** . . . large particle
**4*b*** . . . small particle
120 . . . coil

What is claimed is:

1. A dust core comprising:

a binder including an epoxy resin; and magnetic particles dispersed in the binder, wherein the epoxy resin has at least two or more mesogenic skeletons between two epoxy bonds adjacent along a molecular chain.

2. The dust core according to claim 1, wherein the magnetic particles comprise metal magnetic particles, and an amount of the binder with respect to 100 parts by mass of the metal magnetic particles is 1.0 part by mass or more and 4.0 parts by mass or less.

3. The dust core according to claim 1, wherein the mesogenic skeletons have a structure represented by the following formula (I), (I)

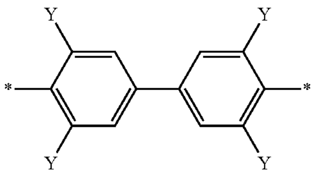

where Y of the formula (I) is selected from —H, an alkyl group with 4 or less carbon atoms, an acetyl group, and a halogen, Y(s) in the mesogenic skeletons may be all the same or different from each other, and

* represents a binding site with an adjacent atom.

4. The dust core according to claim 1, wherein the mesogenic skeletons have a structure represented by the following formula (J), (J)

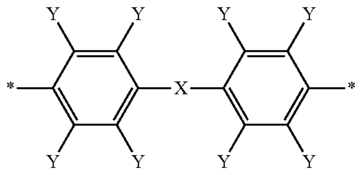

where Y of the formula (J) is selected from a hydrogen, an alkyl group with 4 or less carbon atoms, an acetyl group, and a halogen, Y(s) in the mesogenic skeletons may be all the same or different from each other,

* represents a binding site with an adjacent atom, and

X is at least one linking group selected from a group consisting of:

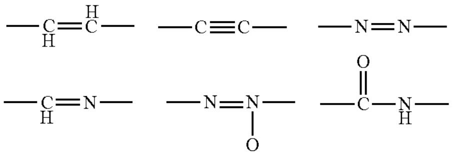

-continued
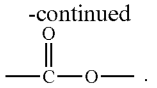
5. An inductor comprising the dust core according to claim 1.
6. The inductor according to claim 5, wherein $R_A/R_B>0.001$ is satisfied, where $R_A$ is a volume resistance after keeping the inductor at 175° C. for 100 hours, and $R_B$ is a volume resistance before keeping the inductor at 175° C. for 100 hours.
* * * * *